July 4, 1961 H. L. WILDER 2,990,764
COMBINED CAMERA SUPPORT, CART AND STEP LADDER
Filed Aug. 19, 1960 3 Sheets-Sheet 1
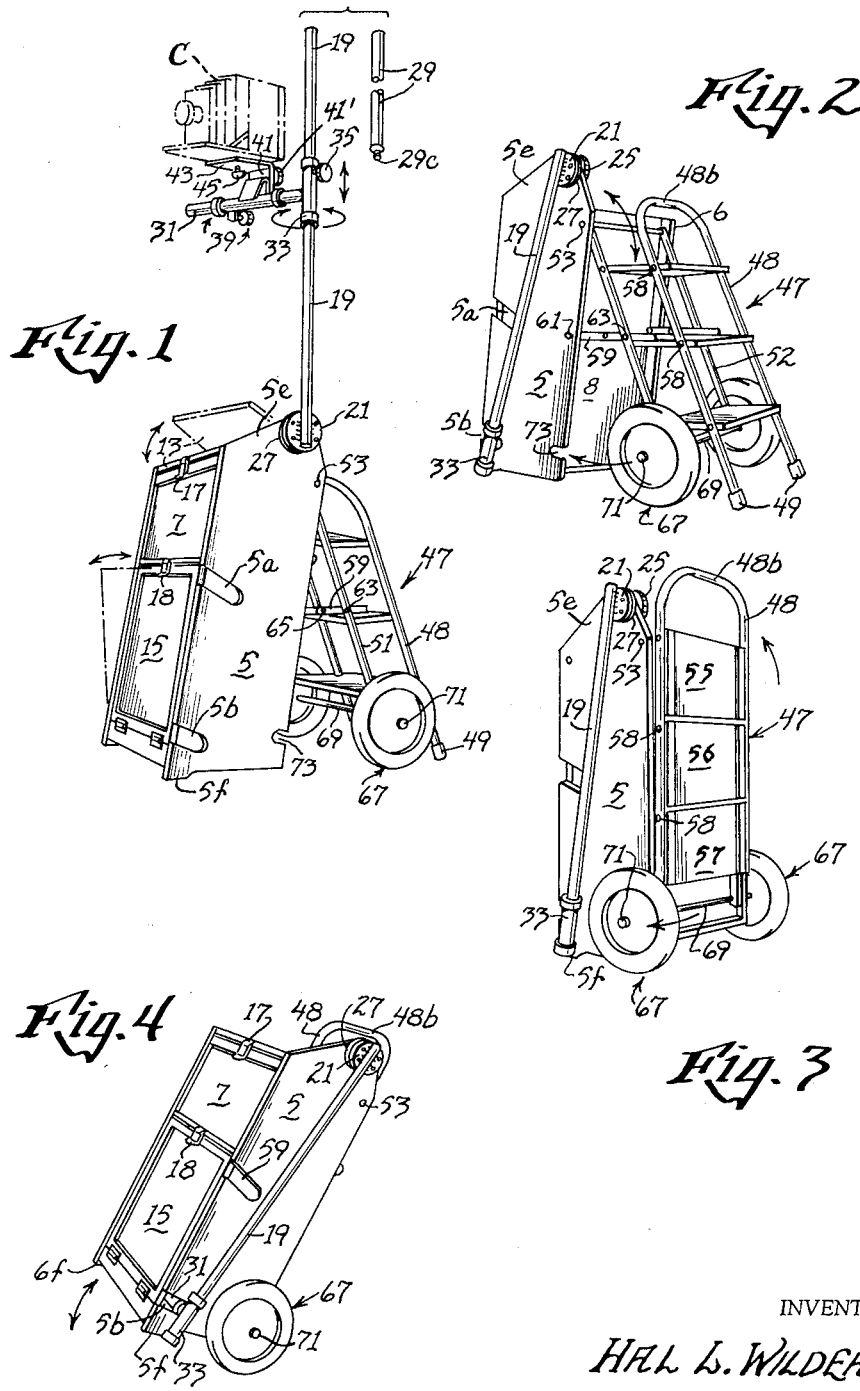
INVENTOR
HAL L. WILDER
BY Felix A. Russell
ATTORNEY July 4, 1961 H. L. WILDER 2,990,764
COMBINED CAMERA SUPPORT, CART AND STEP LADDER
Filed Aug. 19, 1960 3 Sheets-Sheet 2
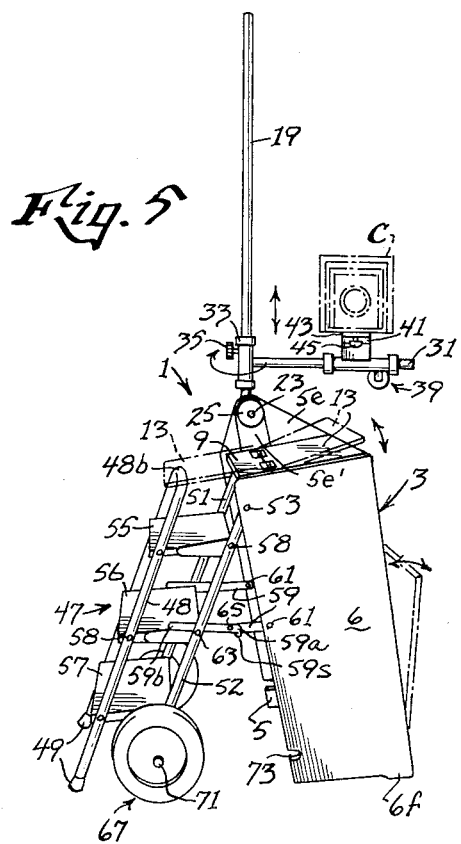
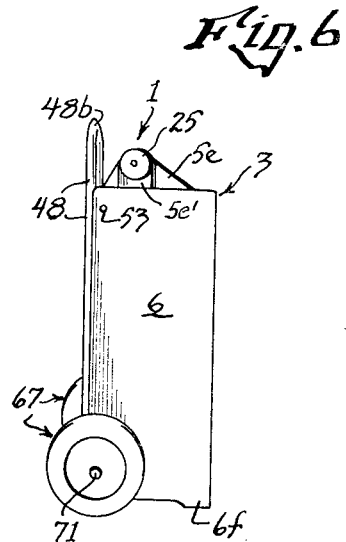
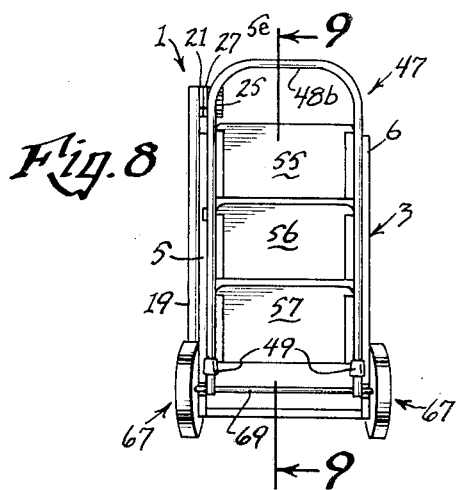
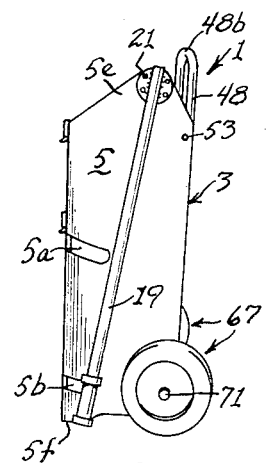
INVENTOR
HAL L. WILDER
BY Felix A. Russell
ATTORNEY

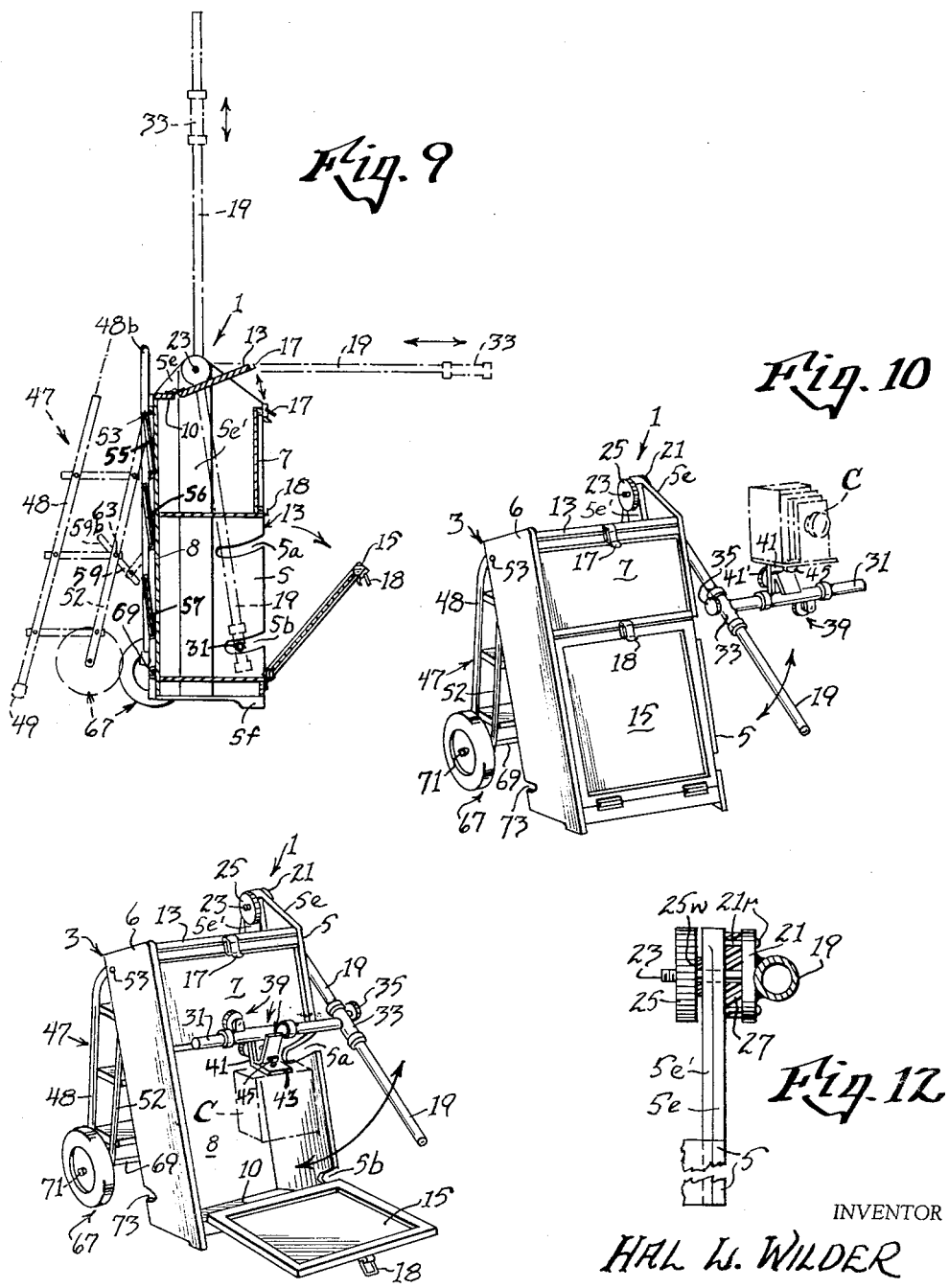

United States Patent Office 2,990,764
Patented July 4, 1961

2,990,764
COMBINED CAMERA SUPPORT, CART AND STEP LADDER
Hal L. Wilder, 3236 Pearl St., Joplin, Mo.
Filed Aug. 19, 1960, Ser. No. 50,755
15 Claims. (Cl. 95—86)

This invention relates to a combined camera support, cart and step ladder.

More particularly the invention pertains to a combined camera support, cart and step ladder, in which the cart body is a vertically elongated cabinet having an upper compartment for holding photographic accessories and a lower compartment for storing a camera, said support comprising (1) a platform to which the camera is fastened by a quickly detachable screw which when loosened permits horizontal turning of the camera thereon, (2) a horizontally disposed arm to and adjustably along and round which said platform is connected by a sleeve-type clamp, (3) a standard-like column to and adjustably along and around which said arm is coupled by another sleeve-type clamp, said column being connected to a side of the cart body adjacent its top by a swivel clamp permitting swinging of said column in a vertical plane so that a camera carried thereby can be held elevated in any desired positions or be swung thereby into storage positions in said compartment; said step ladder comprising (a) a first ladder frame formed of parallel bars pivotally connected at their upper ends for swinging away from their storage positions in a shallow recess in the rear wall of the cabinet, (b) a second inverted U-shaped ladder frame, (c) a plurality of step-forming panels pivotally connected to said frames in parallelogram-linkage arrangement whereby said ladder may be folded flat against the rear cabinet wall for storage or transportation of said cart with the bight portion of said U-shaped frame serving as a handle, and (d) folding braces for limiting the swinging of said step ladder away from said cabinet; the apparatus additionally comprising a hinged lid for said upper compartment swingable to form an extra top ladder step if desired, and easily detachable wheels mounted on the lower portions of said first ladder frame for controlling the tilting and leveling of said cabinet during use and storage, respectively, and for supporting the cart during tilted transportation.

It is an object of this invention to provide a combined support, cart and step ladder for a camera and photographic accessories, whereby a photographer can easily transport and set up his equipment with the camera firmly held in a multiplicity of positions, particularly elevated ones.

It is another object to provide such apparatus in which the cart is a cabinet structure for protective storage of the camera and accessories while being transported or stored.

It is a further object to provide such apparatus in which the camera support is designed for special movement so as to support the camera while mounted thereon in both its many use positions and also in one or more storage positions within the cabinet.

It is another object to provide such apparatus in which the ladder is designed for compact folding into and/or against the cabinet structure.

These and other objects and advantages of the invention will become apparent as the following detailed description proceeds.

In the drawings:

FIGURE 1 is a perspective view of a preferred embodiment of the invention.

FIGURE 2 is a perspective view of the disclosure of FIG. 1, from the right side of said figure, showing the column lowered.

FIGURE 3 is a view similar to FIG. 2, but showing the ladder closed.

FIGURE 4 is a perspective view showing the apparatus tilted into transporting position.

FIGURE 5 is a perspective view similar to FIG. 1, but showing the opposite side of the apparatus.

FIGURE 6 is a view similar to FIG. 5 but showing the parts in storage positions.

FIGURE 7 is a view like FIG. 6, showing the opposite side of the device.

FIGURE 8 is an elevational view of the disclosure of FIG. 7 taken from the right side of said figure.

FIGURE 9 is an elevational view in section taken on the line 9—9 of FIG. 8.

FIGURE 10 is a perspective view showing the camera supported about waist height.

FIGURE 11 is a view similar to FIG. 10, but showing the camera in a position approaching or leaving one of its storage positions.

FIGURE 12 is an enlarged fragmentary elevational view of the column-position-adjusting mechanism partly in vertical axial section.

With reference now to the drawings, the numeral 1 generally designates the apparatus as a whole, and the numeral 3 the cabinet part thereof. Cabinet 3 is disclosed as being formed of side panels 5 and 6, front panel 7, rear panel 8, and top and bottom panels 9 and 10, formed of wood or of composition board or sheet metal, etc. The lower edges of the side panels 5 and 6 are cut on a bias so as to produce the tilting of the cabinet 3 when resting on said edges (in the use set-up of FIG. 1) and so as desirably to have foot portions 5f and 6f. A transverse partition panel 11 (FIG. 9) divides cabinet 3 into an upper compartment for holding photographic accessories and a lower compartment for storage of the camera while mounted on the apparatus. The upper compartment is provided with a hinged lid 13 which can be swung into the phantom-shown position thereof shown in FIG. 5 to form an additional top ladder step when and if desired. The lower camera compartment has a hinged door 15. Both closures are desirably provided with conventional latches 17 and 18 of the trunk-lid fastening bail types.

Side panel 5 has a roughly triangular upper extension 5e on which the swingable standard or column 19 is mounted. Column 19 has welded or otherwise fixed thereto a disc 21 from which projects a pivot pin or shaft 23 threaded at its free end to receive the axially bored and threaded knurled hand wheel 25. Wheel 25 is spaced from extension 5e by a washer 25w. Pin 23 passes through a bearing aperture (not visible) in the extension 5e. A friction disc 27 of a material similar to those used as brake liners, is interposed between column-mounted disc 21 (being fixed thereto as by rivets 21r) and the adjacent face of extension 5e to serve as a variable-friction brake for holding the column 19 in adjusted positions and for firmly clamping the same therein when the hand wheel is tightened sufficiently to prevent further friction-resisted movement. Column 19 is desirably of tubular construction and has its free end internally threaded to receive the threaded coupler 29c of a column extension 29 (FIG. 1) which is optional equipment.

Column 19 has adjustably mounted thereon a camera-supporting arm 31 attached thereto by a partially split sleeve 33 that is clamped in adjusted positions therealong and therearound by a thumb screw 35 in known manner. It should here be noted that the column extension 29 or another like extension (not shown) could be added to the free end of arm 37 if and when needed.

Another thumb-screw-controlled clamp generally designated 39 connects the bracket 41 to the arm 31 for adjustment along and around the same. The free end of bracket 41 constitutes (or carries) the camera-holding platform 43, to which a camera C is fixed by the easily removed and inserted thumb screw 45. Screw 45, when loosened slightly, permits turning of the camera about itself as an axis to different positions on platform 43.

The step-ladder part of the apparatus 1 is generally designated 47. Ladder 47 comprises an inverted U-shaped frame 48 of tubular aluminum alloy or equivalent construction, the ends of which are desirably capped with resilient cups 49 for good protective cushioning and anti-slip frictional engagement with a floor or other surface, and a second parallel frame formed by a pair of parallel tubes 51 and 52 apertured at their upper ends for receiving the rod 53 by which the second frame 51—52 is swingably fastened to the cabinet 3 for movement into and out of the shallow recess formed by the slight insetting of the rear wall panel 7 of the cabinet, as shown in FIG. 2. A plurality of step elements 55—57 of wood, edge-flanged sheet metal, etc., are pivotally connected by rods or pins 58 to the two frames in parallelogram-forming manner so that the ladder can be folded flat within and against the rear portion of the cabinet (as shown in FIGURE 3) for compact storage of the apparatus or for transportation thereof in the tilted position illustrated in FIG. 4, with the bight portion 48b of the rear ladder frame 48 serving as a handle. The step ladder 47 may be provided with a self-latching manually unlatchable device (not shown but of conventional construction) for holding the ladder elements in folded positions. The ladder is held in its open or use condition of FIG. 1 by a pair of articulated braces 59, the forward ends of which are pivotally connected to the walls 5 and 6 by pins 61 and the front portions of which are pivotally connected to the front ladder frame 51—52 by pins 63. The braces are foldable about their rivet-like connectors 65. Each brace has a short extension 59a provided with a conventional underturned stop portion 59s that prevents each brace from swinging upwardly appreciably above dead-center, and has a relatively long extension 59b engageable by the edge of step 54 to effect automatic folding of the braces in response to folding of the ladder into non-use condition.

The forward ladder frame 51—52 is supported by the resilient-tired wheels 67 affixed to stub axles 71 which are retained in place within an axle tube 69 with spring loaded detents (preferably of known "snap on" construction). The axle tube 69 for the quickly attachable and detachable wheels 67 affixed to the stub axles 71 is secured to the lower ends of the frame element 51 and 52. This permits easy removal for a saving of storage or shipping space, with the wheels stored in one of the cabinet compartments or otherwise. The lower rear edges of the side cabinet panels 5 and 6 are notched at 73 to receive the axle tube 69 to permit more compact folding and also to have the cabinet weight supported at least partly directly by rod 69 rather than entirely by rod 53.

FIGS. 6 and 9 (solid lines) show the apparatus in its storage condition and position. For transporting, the apparatus is tilted into the position of FIG. 4 and the handle (bight) portion 48b of the ladder frame 48 is used to push or pull the cart to and from use or storage locations. For use the door 15 is opened, the hand wheel 25 is loosened at least sufficiently to permit swinging of the column into any one of an infinite number of positions in a substantially vertical plane about pivot pin 23, so as to hold the camera C in desired elevation for use. (The substantially horizontal position of column 19 shown in FIG. 9 can be used for photographic copying.) (The ladder can be opened either before or after swinging the column 19 away from its camera-storing positions of FIGS. 4 and 7.) Arm 31 is held in any desired adjusted position along and around column 19 and at substantially right angle thereto by the partially split sleeve 33 controlled by its thumb screw 35. Camera C is quickly and easily detachably connected to a platform 43 by a thumb screw 45 for adjustment thereon about the axis of said screw. Platform 41 is mounted on or made an integral part of the bracket 41. Bracket 41 can be position-adjusted both angularly and spatially relatively to arm 31, by means of the thumb screw 41' passing through a longitudinally elongated aperture (not shown) in the bracket 41, and clamping it against the V-bent metallic strap welded to and forming a part of the clamp device generally designated 39, by which the camera can be adjusted along and round arm 31. Arm 31 can enter either slot 5a or 5b to store the camera either in depending position (FIG. 11) or in an upright position in the lower cabinet compartment (corresponding to positions of arm 31 in FIGS. 3 and 7).

The ladder 47 can be opened to the conditions of FIGS. 1, 5 and 11 either before or after swinging thereof away from the folded and collapsed condition thereof shown in FIGS. 3 and 8. When opened the apparatus rests on feet 5f and 6f, wheels 67, ladder foot cups 49 and the rear lower corners of the side panels 5 and 6. The hinged lid 13 for the upper accessory-storing compartment can be swung over to rest on the top of ladder frame 48 (as shown in phantom in FIG. 1) to serve as an extra top step. This will be particularly desirable if the column extension 29 is screwed onto the upper end of standard 19, for taking pictures from even greater elevations. In collapsing the ladder, the extensions 59b of braces 59 will engage the middle step 56 so as to effect a simultaneous folding of the ladder against and partly into the shallow recess in the adjacent cabinet. Now the apparatus is again in condition for transportation and storage.

While but one form of the invention has been described and claimed, it is readily apparent to those skilled in the art that many minor modifications may be made without departing from the spirit of the invention or the scope of the appended claims.

What is claimed is:

1. A combined camera support, cart and step ladder, comprising: means defining a protective enclosure for a camera when stored therein, wheels attached to said enclosure means whereby the latter may be conveniently transported as a hand cart; a camera-supporting column movably connected to said enclosure means and movable to support a camera protectively stored within said enclosure means or in use positions externally thereof; a camera-supporting arm; means for adjustably attaching said arm to said column for varying the position of a camera along and around said column; a camera-holding support, adjustable structure for connecting and for varying the position of said support to and along and around said arm; and step-ladder structure attached to said enclosure means whereby a photographer may operate a camera mounted on said support at desired elevations.

2. Apparatus according to claim 1, said enclosurre being divided into a camera-storing compartment and an accessory-holding compartment.

3. Apparatus according to claim 2, one of said compartments having a closure movable so as to engage the upper portion of said step-ladder structure to constitute an additional top step if desired.

4. Apparatus according to claim 1, said column being movable so as to support said camera while attached thereto in use positions and also in storage positions within said enclosure.

5. Apparatus according to claim 4, said column being coupled to said cart for swinging in a substantially vertical plane and having means for controlling the swinging so as to vary the force required therefor and to lock the same in desired positions.

6. Apparatus according to claim 5, said enclosure having at least one notch in a wall thereof to permit entrance of a portion of said support therein to position said camera in said enclosure.

7. Apparatus according to claim 1, said support additionally comprising a platform-like camera holder and a quickly detachable screw for connecting said camera thereto for adjustment thereof around said screw as an axis.

8. Apparatus according to claim 1, said column being swingable to horizontally disposed positions whereby a camera supported thereby may be supported above a table or the like for photographic copying.

9. Apparatus according to claim 1 and additionally comprising an arm supported on said column, and adjustable connecting and clamping means for holding said arm in various camera-supporting positions along and around said column.

10. Apparatus according to claim 9 and additionally comprising quickly detachable extension means for at least one of said column and arm.

11. Apparatus according to claim 1, said step-ladder structure being foldable toward said enclosure means for increased compactness during storage or transportation.

12. Apparatus according to claim 11, said step-ladder structure also being collapsible upon itself for further compactness.

13. Apparatus according to claim 12 and additionally comprising folding braces for holding said step-ladder structure open with said enclosure means constituting the other upright portion thereof.

14. Apparatus according to claim 13, said wheels being mounted on said step-ladder structure for easy opening and closing thereof, and movable therewith when closed to underlie said enclosure to support the same during transportation or storage thereof.

15. Apparatus according to claim 1 and additionally comprising means for quickly and easily detachably connecting said wheels to said apparatus whereby the compactness thereof may be increased for shipping or storage thereof.

References Cited in the file of this patent

UNITED STATES PATENTS 2,707,585      Hoey _____ May 3, 1955